United States Patent [19]

Terada et al.

[11] Patent Number: 5,347,441
[45] Date of Patent: Sep. 13, 1994

[54] THYRISTOR CONVERTER SYSTEM WITH HIGHER HARMONICS SUPPRESSION

[75] Inventors: Makoto Terada; Isao Furo; Hiroshi Suzuki; Isao Iyoda, all of Tokyo, Japan

[73] Assignee: Mitsubishi Denki Kabushiki Kaisha, Tokyo, Japan

[21] Appl. No.: 948,496

[22] Filed: Sep. 22, 1992

Related U.S. Application Data

[63] Continuation-in-part of Ser. No. 583,199, Sep. 17, 1990, abandoned.

[30] Foreign Application Priority Data

Sep. 18, 1989 [JP] Japan .................. 1-239837

[51] Int. Cl.⁵ ............................................. H02J 1/02
[52] U.S. Cl. ........................ 363/39; 363/44; 363/128
[58] Field of Search ............... 323/207; 363/39, 44, 363/45, 46, 81, 84, 85, 87, 89, 127, 128

[56] References Cited

U.S. PATENT DOCUMENTS

| | | | |
|---|---|---|---|
| 3,825,814 | 7/1974 | Pelly | 363/45 |
| 3,829,759 | 8/1974 | Thorborg | 323/207 |
| 3,900,792 | 8/1975 | Moltgen | 323/207 |
| 4,130,861 | 12/1978 | LaForest | 363/39 |
| 4,377,780 | 3/1983 | Bjorklund | 363/35 |
| 4,602,199 | 7/1986 | Walker | 323/207 |
| 4,757,434 | 7/1988 | Kawabata et al. | 363/41 |
| 4,812,669 | 3/1989 | Takeda et al. | 363/98 |
| 4,823,251 | 4/1989 | Kawabata et al. | 363/98 |
| 5,047,909 | 9/1991 | Hosoda | 323/207 |
| 5,138,247 | 8/1992 | Tanoue et al. | 323/207 |

FOREIGN PATENT DOCUMENTS

| | | | |
|---|---|---|---|
| 0254073 | 4/1988 | European Pat. Off. | H02M 1/12 |
| 56-3574A | 1/1981 | Japan | H02M 1/12 |

OTHER PUBLICATIONS

Kimbark; "Direct Current Transmission"; vol. I, Dec. 1971; pp. 295–313.

Peng et al.; "A Study of Active Filters Using Quad-Series Voltage-Source PWM Converters for Harmonic Compensation", 18th IEEE Power Electronics Specialists Conference; Dec. 1987; pp. 204–212.

*Primary Examiner*—Jeffrey L. Sterrett
*Attorney, Agent, or Firm*—Leydig, Voit & Mayer

[57] ABSTRACT

A semi-conductor bridge thyrister converter circuit for converting AC power into DC power with suppression of the higher harmonics generated by the circuit including a semi-conductor converter circuit, a control circuit, and instrument transformers for measuring the voltages and the currents at the source and the load side at a node. On the basis of the outputs of these transformers, the control circuit controls the control delay angle and the overlap angle of the thyristers of the semi-conductor converter circuit such that higher harmonics generated by the converter current are reduced to a minimum as seen from the power system side.

18 Claims, 10 Drawing Sheets

α : DELAY ANGLE u : OVERLAP ANGLE

THYRISTOR CONVERTER SYSTEM WITH HIGHER HARMONICS SUPPRESSION

This application is a continuation-in-part of application Ser. No. 07/583,199 filed Sep. 17, 1990, now abandoned.

BACKGROUND OF THE INVENTION

This invention relates to converter systems for converting AC power into DC power with suppression of higher harmonics at the installation point.

In the case where semiconductor converter circuits, such as inverters, bridge thyrister converters, thyrister motors utilizing cyclo-converters, etc., are coupled directly to power supply systems, higher harmonics generated by the converter circuits flow into the power system which usually have smaller impedance, thereby generating a harmonic distortion in the source power supply.

Thus, voltages having harmonic distortions are supplied to the loads connected to the power supply system. These higher harmonics may overheat the electrical components, especially capacitors supplied therewith, sometimes giving rise to insulation failures. When, on the other hand, reactors are coupled in series with the capacitors for preventing the higher harmonics from flowing into the capacitors, abnormal noise or temperature rise may be observed in such reactors.

For the purpose of reducing the damage caused by the higher harmonics, passive filters consisting of passive elements such as reactors and capacitors, or active filters consisting of active elements, are utilized. These filters, however, have some resistance, which increases insertion energy loss and thus reduces the efficiency of the system.

Figure 1:
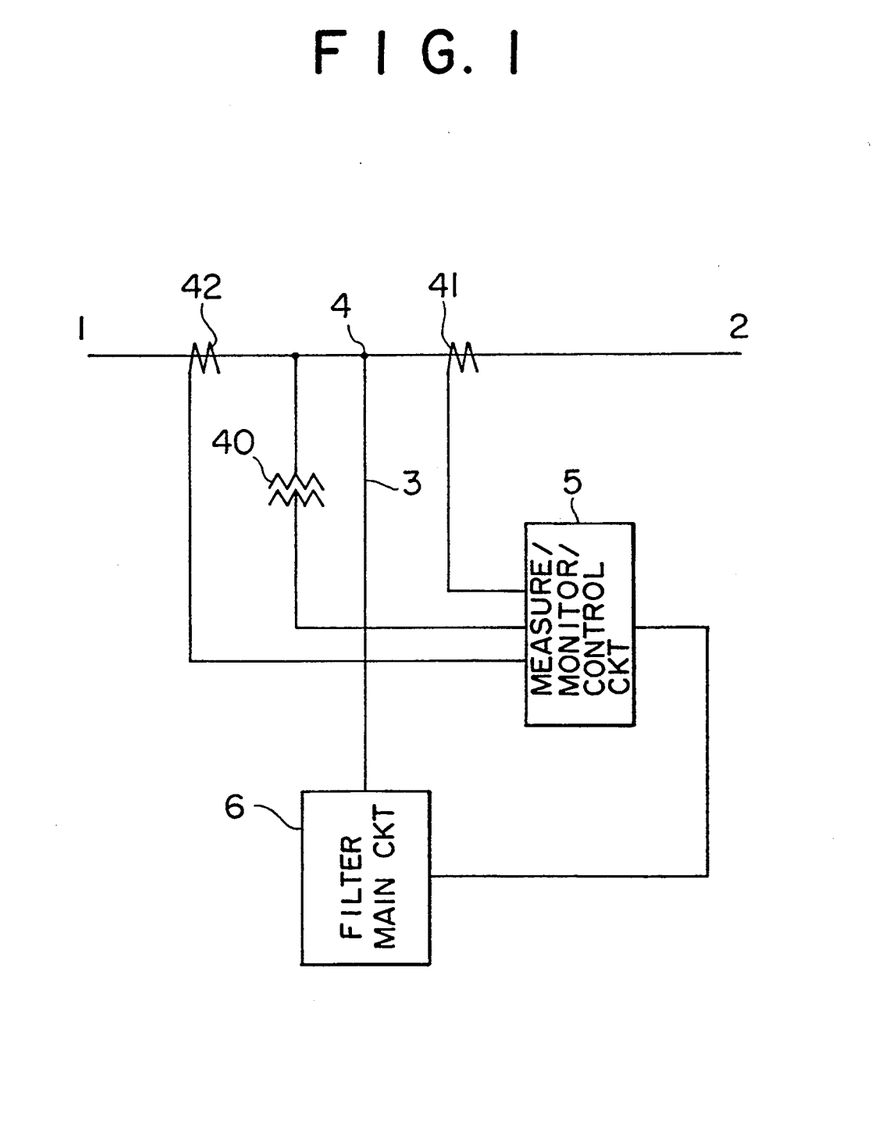
FIG. 1 is a circuit block diagram of a conventional higher harmonics suppression system.

FIG. 1 shows a conventional system for suppressing higher harmonics. A branch line 3 is connected to an intermediate node point 4 between the power supply side 1 and a load side 2, of the higher harmonics suppressing system. The outputs of the instrument transformers 40, 41, and 42, which detect the voltage at the branch point, the load current at the side of the user load, and the current at the power system side, respectively, are introduced to a measurement/monitor/control circuit 5, which measures and monitors the higher harmonics. A main filter circuit 6, controlled by the measurement/monitor/control circuit 5, is connected to the node 4 for absorbing the higher harmonics.

In the system of FIG. 1, the higher harmonics being generated from electrical components connected to the user load side 2 and flowing into the power supply side 1 are branched into the filter circuit 6 to be absorbed therein. Thus, the higher harmonic contents flowing into the power supply side 1 are reduced.

This system for suppressing the higher harmonics is good, both in principle and in practical operation. However, the cost of installation may become substantial if such systems are to be provided for each one of the loads connected to the power supply system.

Among the loads coupled to the power source, there are those which require fine waveform control that is effected by means of inverters, cyclo-converters, or the like. However, there are also loads with large inertia, such as electrical resistance heaters or electrolytic cell loads, for which small fluctuations do not matter and only the time integral of the power or that of current supplied thereto is significant for their operation. In the case of these loads, small fluctuations in the waveform have little effect on their operation. That is, if the loads are responsive only to the amount of heat or electric quantity which corresponds to the time integral of the power or current, the instantaneous fluctuations in the waveforms are filtered and smoothed due to the integrating function of the load and, hence, have no vital effect on the whole.

SUMMARY OF THE INVENTION

It is therefore a primary object of this invention to provide a simple and inexpensive converter system for converting AC power supplied from an AC power source into DC power supplied to a branch load irrespective of high frequency deviation, wherein the generation of higher harmonics is effectively suppressed.

The above object is accomplished in accordance with the principle of this invention by a converter system which comprises: semiconductor converter circuit means, including semiconductor switching elements coupled across the AC power source, for converting the AC power supplied from the AC power source into DC power, wherein the DC power is supplied to a branch load of large inertia, i.e., a load having a large time constant, such as a resistance heater or an electrolytic cell; measurement means for measuring electrical parameters at the power system side and the load side; and control circuit means, having inputs coupled to outputs of the measurement means, for controlling the switching operations of the semiconductor switching elements of the semiconductor converter circuit means, wherein the control circuit means controls the delay angle of the semiconductor switching elements so that the higher harmonic contents of the current flowing into the power system side are suppressed.

Preferably, the measurement means comprises instrument transformers for measuring voltages and currents at the power source side and the load side. It is also preferred that the semiconductor switching elements comprise thyristers or transistors. The control circuit means comprises: sample and hold circuit means for holding sample values of the electrical parameters measured according to a predetermined timing sequence by the measurement means; multiplexer means coupled to the sample and hold circuit means for multiplexing outputs of the sample and hold circuit means; and a microprocessor, coupled to the multiplexer means for determining the control delay angle in response to the output of the multiplexer means.

BRIEF DESCRIPTION OF THE DRAWINGS

The novel features which are believed to be characteristic of this invention are set forth with particularity in the appended claims. This invention itself, however, both as to its organization and method of operations, together with further objects and advantages thereof, may best be understood from the detailed description of the preferred embodiment in connection with the accompanying drawings, in which;

FIG. 3B is a block diagram of a thyristor converter circuit like that of FIG. 3 with an electrolytic cell load;

FIGS. 5(A) and 5(B) are a flow chart showing the operation of the control circuit of the converter circuit of FIG. 4, wherein FIGS. 5(A) and 5(B) show the first and second half of the operation procedure, respectively.

In the drawings, like reference numerals represent like or corresponding parts or elements.

DETAILED DESCRIPTION OF THE PREFERRED EMBODIMENTS

Figure 2:
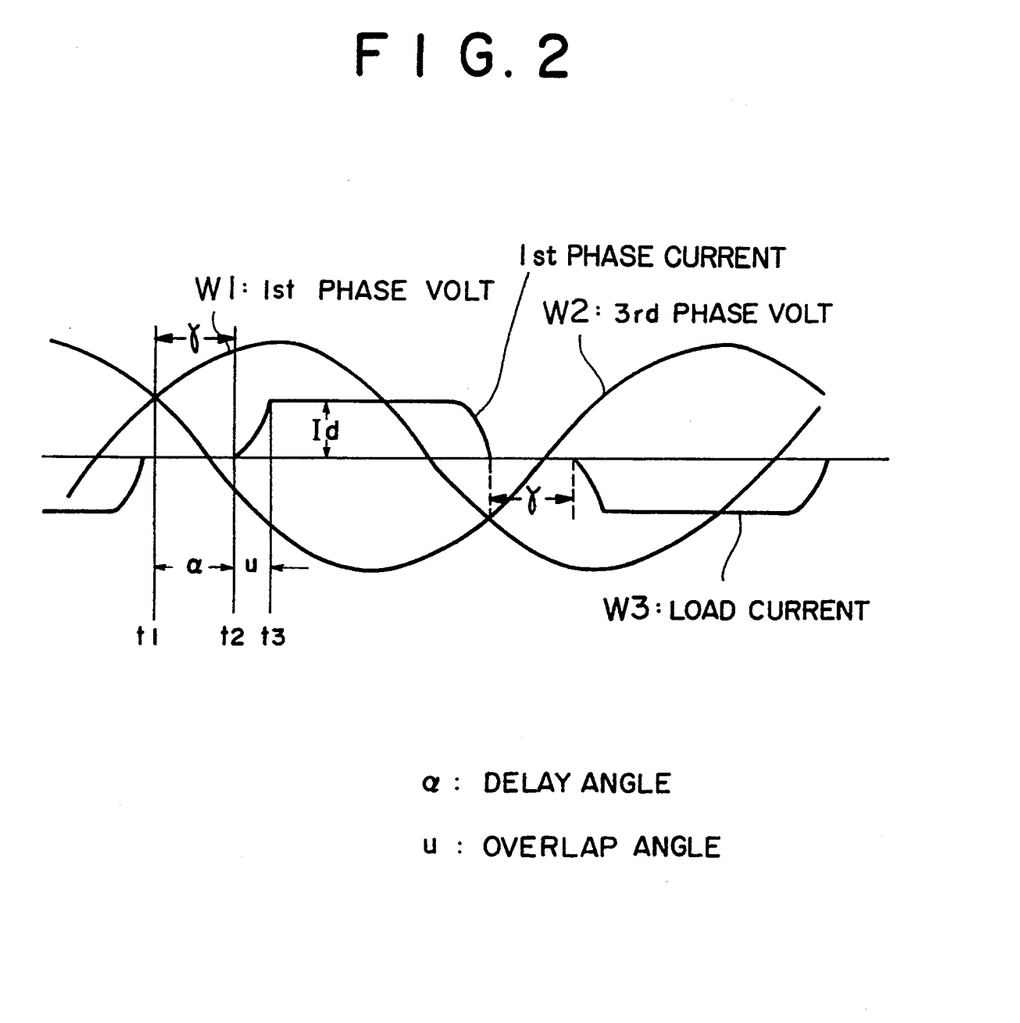
FIG. 2 shows representative waveforms in a 3-phase thyrister bridge type converter circuit.

First, the principle of this invention is described with reference to FIG. 2, which shows the voltage and current waveforms of a 3-phase bridge type thyrister converter circuit (rectifier circuit) for rectifying AC power into DC power. In FIG. 2, curves W1 and W2 represent the first and the third phase source voltage, respectively; and curve W3 represents the load current, i.e., the current through a thyrister converter circuit element (an arm of the thyrister bridge circuit) corresponding to the first phase.

As shown in FIG. 2, the load current W3 is null during the delay time $\gamma$ (corresponding to the control delay angle $\alpha$) from the time point t1 at which the first and the third phase voltage waveforms W1 and W3 cross each other such that the magnitude of W1 becomes larger than that of W2.

From the time point t2 at the end of the delay time $\gamma$, the load current W3 gradually increases during the rise time $\sigma$ (corresponding to the overlap angle u), to reach the stable constant value Id at the time point t3 at the end of the rise time $\sigma$. In the case where the overlap angle u is not negligibly small, it is well known that the overlap angle u is expressed as follows:

$$u = -\alpha + \cos^{-1}\{\cos\alpha - (6X_sI_d)/(\pi Ed_0)\} \quad (1)$$

where:

$\alpha$ is the delay angle;

Id is the DC circuit current;

$Ed_0$ is the average DC voltage under the no-load/no-control condition, which is equal to about 2.34 Vs;

Xs is the reactance of the power supply side (i.e., the commutation reactance per phase); and Vs is the applied AC line voltage (i.e., the effective value of the source phase voltage).

If, for the purpose of varying the output of the converter to the load side, the delay angle $\alpha$ or the value of the load itself is varied, the overlap angle u is stabilized to the value which satisfies the above equation (1).

During these changes, the reactance Xs behind the power source side can be regarded as substantially constant. Thus, taking the differential of the above equation (1), we obtain:

$$\{\sin(u+\alpha) - \sin\alpha\}\Delta\alpha = (6X_s/\pi Ed_0)\{Id - (\Delta Ed_0 Id/Ed_0)\}$$

on the assumption that $\Delta Ed_0 = 0$, the following equation (2) is obtained:

$$X_s = (\pi/6)Ed_0(\Delta\alpha/\Delta Id)\{\sin(u+\alpha) - \sin\alpha\} \quad (2)$$

Thus, the reactance Xs of the power supply side can be determined by means of this equation (2) if the variation $\Delta Id$ of the DC current Id corresponding to the variation of the load is known.

By utilizing the value of the reactance Xs of the power supply side obtained as described above, the relation between the control delay angle $\alpha$ and the overlap angle u can be determined uniquely by means of the following equation (3):

$$\cos\alpha - \cos(\alpha+u) = (6X_sId)/(\pi Ed_0) \quad (3)$$

Generally, the higher harmonic contents (the ratios of the higher harmonic components with respect to the fundamental component) of the input waveform of the converter circuit consisting of the 3-phase thyrister bridge decrease as the overlap angle u increases. As is well known to those skilled in the art, the exact relation between the higher harmonic contents and the overlap angle u can be determined on the basis of Fourier analysis. It can thus generally be concluded that the higher harmonic contents decrease rapidly when the overlap angle u increases from 0 to 30 degrees.

If the delay angle $\alpha$ is fixed to a predetermined value, the overlap angle u is determined by the state of the connected load, (i.e., the values of the DC current Id and voltage Ed,) and the state of the power supply side (i.e., the value of reactance Xs). Further, the higher harmonic contents can be calculated on the basis of the delay angle $\alpha$ and overlap angle u.

Thus, as described above, in the bridge type converter circuit for rectifying AC power into DC power, the overlap angle u is determined from the states of the load side and the power source side, when the delay angle $\alpha$ is varied, and, hence, the higher harmonic contents can thereby be modified.

When the overlap angle u and the delay angle $\alpha$ are controlled as described above, the input to the load, i.e., the amount of heat or the amount of electric quantity (electric charge), varies when observed with respect to short periods of time. The accumulative amount of heat or electric quantity, which is proportional to the time integral of the power or the current applied to the load, can be adjusted to a predetermined value required by the load, if the magnitude of the AC input is adjusted by means of an appropriate regulator means such as an IVR (induction voltage regulator). In the following, the method of this adjustment is described in the case where (1) the load is a resistance heater or incandescent lamp, and where (2) the load is a rectifier driven load such as an electrolytic cell.

Resistance Load

In the case where the load is a resistance heater or an incandescent lamp, the adjustment and regulation of the amount of heat generated therein may be affected as follows.

Figure 2A:
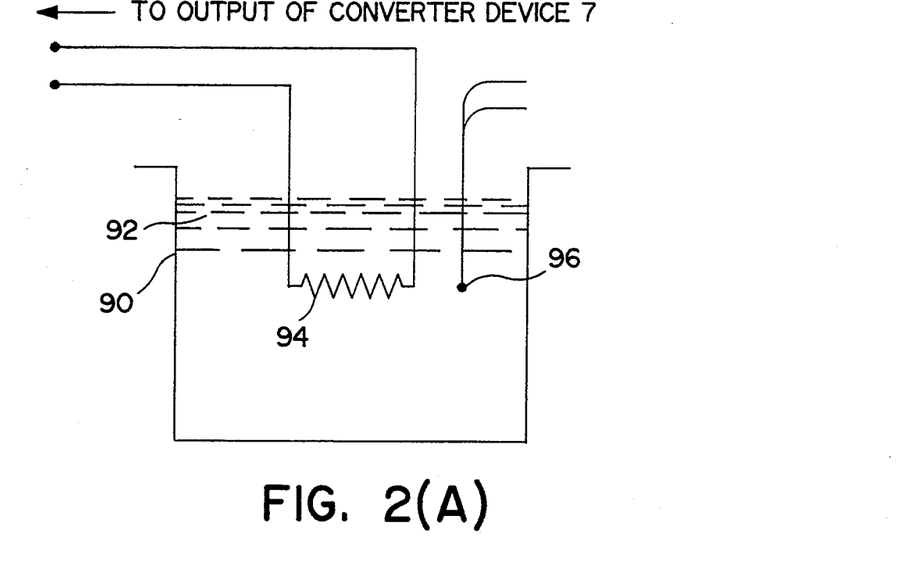
FIG. 2A illustrates a resistance heater load of a suppression system according to the instant invention.

Depicted in FIG. 2A is a container 90, having a substance 92 disposed therein. A resistance heater 94 is immersed in the substance for heating the substance 92 to a desired temperature. A temperature sensor 96 is also provided to monitor the temperature of the substance 92. Although the substance depicted in FIG. 2A is in liquid form, the resistance heater can also be applied to a substance in solid form.

In the case where a voltage is applied to resistance heater 94, the variation of the temperature t of the substance 92 within the container 90, heated as the load of the resistance heater, is given by the following equation:

$$t = (Q/K + t_a) - \{(Q/K) - (t_i - t_a)\}e^{-(k/c)\tau} = (Q/K + t_a) - \{(Q/K + t_a) - t_i\}e^{-(k/c)\tau} \quad (4)$$

where:
- $\tau$: time after the start of heating;
- t: temperature of the solid or liquid at time $\tau$[°C.];
- $t_a$: ambient temperature [°C.];
- Q: heat generated by the heater [Kcal/h];
- K: radiation coefficient [Kcal/h. °C.], which is equivalent to U·F.;
- C: heat capacity of the solid or liquid [Kcal/°C.]- which is equivalent to $V \cdot \rho \cdot C_p$
- U: total heat transfer coefficient of the substance
- F: surface area of the substance
- V: volume of the substance
- $\rho$: density of the substance
- $C_p$: specific heat of the substance The time constant for the temperature variation is thus $$T_c = C/K \quad (5)$$

The time constant $T_c$, which is dependent on the dimensions of the container 50 and the radiation coefficient K, is usually on the order of several minutes to several tens of minutes in the case of an electrically heated liquid or solid disposed in a container.

On the other hand, the rise time $\sigma$ of the power converter circuit 7 is below from several tens of milliseconds to several hundreds of milliseconds.

The degree to which the input harmonic components affect the temperature variation of the heater is given by the equations set forth below. By rewriting equation (1), we obtain:

$$t - t_1 = (Q/K + t_a)\{1 - e^{-(k/c)t}\} \quad (6)$$

$$\Delta t = \frac{1}{1 + (c/k)s}(Q/K + t_a)$$

$$= \frac{1}{1 + T_c s}(Q/K + t_a)$$

$$\Delta t(j\omega) = \frac{1}{1 + j\omega T_c}(Q/K + t_a)$$

$$|\Delta t(j\omega)| = \frac{1}{\sqrt{1 + \omega^2 T_c^2}}(Q/K + t_a)$$

when $\omega T_c \gg 1$ $$|\Delta t(j\omega)| = \frac{1}{\sqrt{\omega^2 T_c^2}} = \frac{1}{\omega T_c}$$

Substituting a frequency, f, of 50 Hz into equation 6, the following result is obtained:

$$\omega = 2\pi \times 50$$

$$\omega_n = 2\pi f n = 2\pi n \times 50 = 2\pi \times 50 \times 5 \sim 7 = 1500 \sim 2000$$

where n is the order of higher harmonics.

Usually, time constant $T_c$ is not less than 1 minute and the following relationship is realized:

$$\frac{1}{\omega T_c} \leq \frac{1}{1500 \times 60} \approx \frac{1}{10^5}$$

Therefore, the amplitude of $\Delta t$ has an order of magnitude of about $10^{-5}$. This change in temperature is so small that it is undetected by a conventional thermometer.

Thus, the rise time $\sigma$ of the power converter circuit 7 is sufficiently shorter than the heating response of the system as a whole. Consequently, the waveform distortion within a single cycle of the AC input does not affect the response of the system as a whole including the specific load as above.

When a current including higher harmonics is supplied to the load, the input current I to the load may be expressed as follows:

$$I = I_0 + I_1 \sin(\omega t + \alpha_1) + I_2 \sin(2\omega t + \alpha_2) + \ldots + I_n \sin(n\omega t + \alpha_n) \quad (7)$$

Thus, the square of I is:

$$I^2 = I_0^2 + (1/2)(I_1^2 + I_2^2 + \ldots + I_a^2) +$$

$$2 \{I_0 I_1 \sin(\omega t + \alpha_1) + I_1 I_2 \cos(3\omega t + \alpha_1 + \alpha_2) + \ldots + I_{n-1} I_n \cos((2n-1)\omega t + \alpha_{n-1} + \alpha_n)\} -$$

$$(1/2) \{I_1^2 \cos(2\omega t + 2\alpha_1) + I_2^2 \cos(4\omega t + 2\alpha_2) + \ldots +$$

$$I_n^2 \cos(2n\omega t + 2\alpha_n)\}$$

Since the amount of heat W expressed in P.U. can be given as follows:

$$W = \int_0^{nT} I^2 \, dt \quad (8)$$

Then, $$W = \int_0^{nt} \{I_0^2 + (1/2)(I_1^2 + I_2^2 + \ldots + I_n^2)\}dt +$$

$$2 \int_0^{nT} \{I_0 I_1 \sin(\omega t + \alpha_1) +$$

$$I_1 I_2 \cos(3\omega t + \alpha_1 + \alpha_2) \ldots +$$

$$I_{n-1} I_n \cos((2n-1)\omega t + \alpha_{n-1} + \alpha_n)\}dt -$$

$$(1/2) \int_0^{nT} \{I_1^2 \cos(2\omega t + 2\alpha_1) +$$

$$I_2^2 \cos(4\omega t + 2\alpha_2) \ldots +$$

$$I_n^2 \cos(2n\omega t + 2\alpha_n)\}dt$$

wherein the second and the third integral term ranging over an interval which is an integral multiple n of the period T, and, hence, both tend to zero. Consequently, $$W = \{I_0^2 + (\tfrac{1}{2})(I_1^2 + I_2^2 + \ldots + I_n^2)\}nT \quad (9)$$

wherein the amplitudes $I_0, I_1, I_2, \ldots, I_n$ of the higher harmonics contained in the input can be determined uniquely. Accordingly, in the case where the load is a resistance heater, the heat generated in the load can be adjusted by only adjusting the amplitudes of the input containing higher harmonics.

When the shape of the waveform repeated in each cycle is determined, the higher harmonic components of the waveform are determined uniquely. Namely, for a current waveform I, the ratios:

$$I_0/I, I_2/I, I_3/I, \qquad (10)$$

for the respective harmonic components $I_0, I_1, I_2, \ldots, I_n$ remain constant irrespective of the peak value of the waveform. This is due to the definition of the Fourier integral.

Thus, for the purpose of maintaining the heat W generated by the current I constant, it is sufficient to maintain the peak value of the waveform at a constant level, without modifying the waveform itself. Accordingly, if the following ratios $$I_0/I, I_2/I, \ldots I_n/I, \qquad (11)$$

can be maintained at desired values, the harmonic component ratios at the AC input side can be controlled to predetermined levels. Then the input from the resistance heater to the load combined with the output of the heater load side can be maintained sufficiently constant solely by adjusting the peak value of the input.

In summary, it has been shown that the amount of generated heat is determined not by the phase of the input waveform but by the magnitude of the respective harmonic components. In addition, the amount of generated heat can be increased or decreased by adjusting the magnitude of the converter input without changing the harmonic component percentage of the input waveform.

ELECTROLYTIC CELL LOAD

In the case where the load is a rectifying type load such as battery charger or an electrolytic cell (storage battery), the adjustment and regulation of the accumulative amount of electric quantity (electric charge) supplied thereto may be affected as follows.

As in the above case, the input current I to the load may be expressed as follows:

$$I = I_0 + I_1 \sin(\omega t + \alpha_1) + \ldots + I_n \sin(n\omega t + \alpha_n)$$

Thus, the absolute value of I is:

$$|I| = |I_0 + I_1 \sin(\omega t + \alpha_1) + \ldots + I_n \sin(n\omega t + \alpha_n)|$$

Consequently, the accumulative amount of electric quantity or the effective input C to the load is:

$$\begin{aligned}
C &= \int_0^{nT} |I| dt \qquad (12)\\
&= \int_0^{nT} \{|I_0 + I_1 \sin(\omega t + \alpha_1) + \\
&\quad I_2 \sin(2\omega t \, \alpha_2) + \ldots + \\
&\quad I_n \sin(n\omega t + \alpha_n)|\} dt
\end{aligned}$$

wherein the contribution of the n'th harmonic component $C_n$ is:

$$\begin{aligned}
C_n &= \int_{-\delta}^{T-\delta} |I_n| dt \\
&= \int_{-\delta}^{T-\delta} |I_n \sin(n\omega t + \alpha_n)| dt \\
&= \int_{-\delta}^{T-\delta} \{(2I_n/\pi) - (4I_n/3\pi)\cos 2\omega t - \\
&\quad 4I_n \cos 4\omega t - \ldots - \\
&\quad (4I_n/(4n^2 - 1))\cos 2n\omega t\} dt \\
&= (2I_n/\pi) \cdot T
\end{aligned}$$

Namely, since the original waveform is a composition of a DC component and even order harmonic components, the average thereof is equal to the integral of the DC components. Thus, $$\begin{aligned}
C &= \int_0^{nT} |I| dt \leq \qquad (14) \\
&\quad \int_0^{nT} \{|I_0| + |I_{10}| + |I_{20}| + \ldots + |I_{n0}|\} dt \\
&= nT\{|I_0| + |I_{10}| + |I_{20}| + \ldots + |I_{n0}|\} \cdot (2/\pi)
\end{aligned}$$

The output C after a sufficient number of periods T (exceeding n periods) is affected only by the amplitudes of the harmonics contained in the input current. Further, each one of the harmonic components $I_1, \ldots, I_n$ contained in the input current is determined uniquely. It can therefore be concluded that in the case where an electrolytic load is connected to the power converter, the amount of electricity which is effectively input to the load can be regulated properly only by adjusting the amplitudes of the input.

Figure 2B:
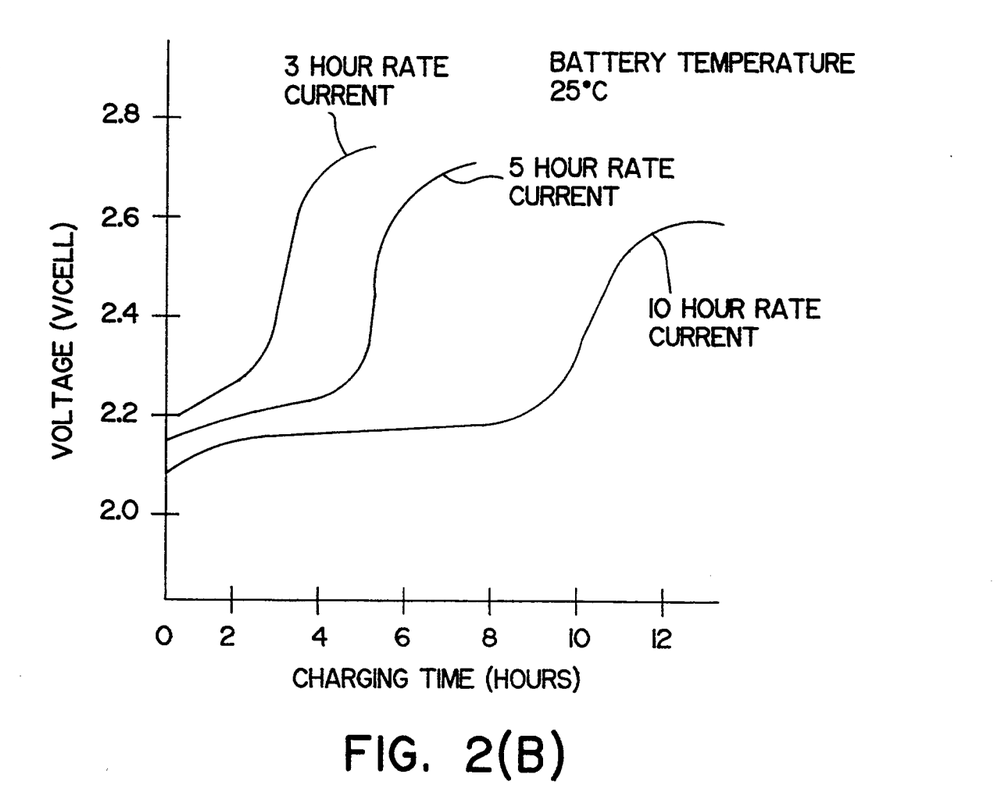
FIG. 2B is a graph depicting the relationship between charging voltage and charging time of an electrolytic cell.
Figure 2C:
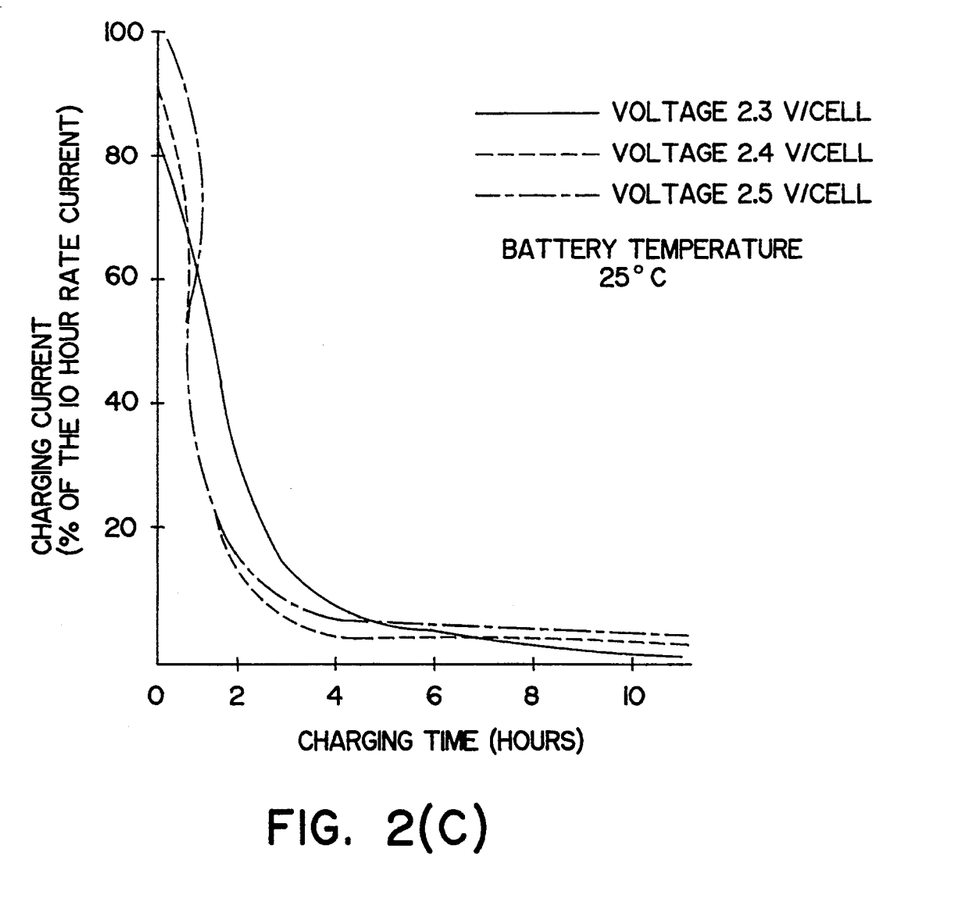
FIG. 2C is a graph depicting the relationship between charging time and charging current of an electrolytic cell.

Referring to FIGS. 2B and 2C, in the case where a storage battery is charged, the battery, as the load, requires about 3 to 10 hours before the voltage rises and the battery becomes capable of discharging. FIG. 2B graphically depicts the number of hours needed to charge an electrolytic cell to a given voltage using a 3-hour rate current. FIG. 2C illustrates the amount of time needed to charge a 2.3 v cell, a 2.4 v cell and a 2.5 v cell using a given current measured as a percentage of the 10 hour rate current.

Thus, the delay time $\gamma$ (time needed to charge the battery) is sufficiently long compared with the rise and fall time—from several to 100 milliseconds—of the converter device. Consequently, even if the input waveform to the converter device undergoes complicated variations within one cycle, it does not affect the charging function and performance.

As shown by equation 14, provided the time is sufficiently long, the electric charge due to the current is determined by the magnitudes of the respective harmonic components within the input AC waveform to the load; or, more particularly, within the output of the converter device.

Alternatively, when the form of one cycle of the distortion waveform is determined, the respective harmonic component percentages:

$$|I_0|/|I_1|, |I_2|/|I_1|, \ldots, |I_n|/|I_1|$$

remain constant independent of the peak value of output current from the converter. Thus, to maintain the charge C of the above equation at a desired level, the input to the battery, namely the peak value of the output waveform of the converter device, must be modified. Under this circumstance, except for the magnitude thereof, the input waveform of the converter device is not affected. Even when the input waveform of the converter device is subjected to waveform control such that the harmonic distortion in the AC power system is eliminated, the load at the output side of the converter device is affected only by the peak value of the waveform. Thus, if the output of the converter device is adjusted to a magnitude necessary for the load, the storage battery load is capable of executing its desired functions.

Figure 3:
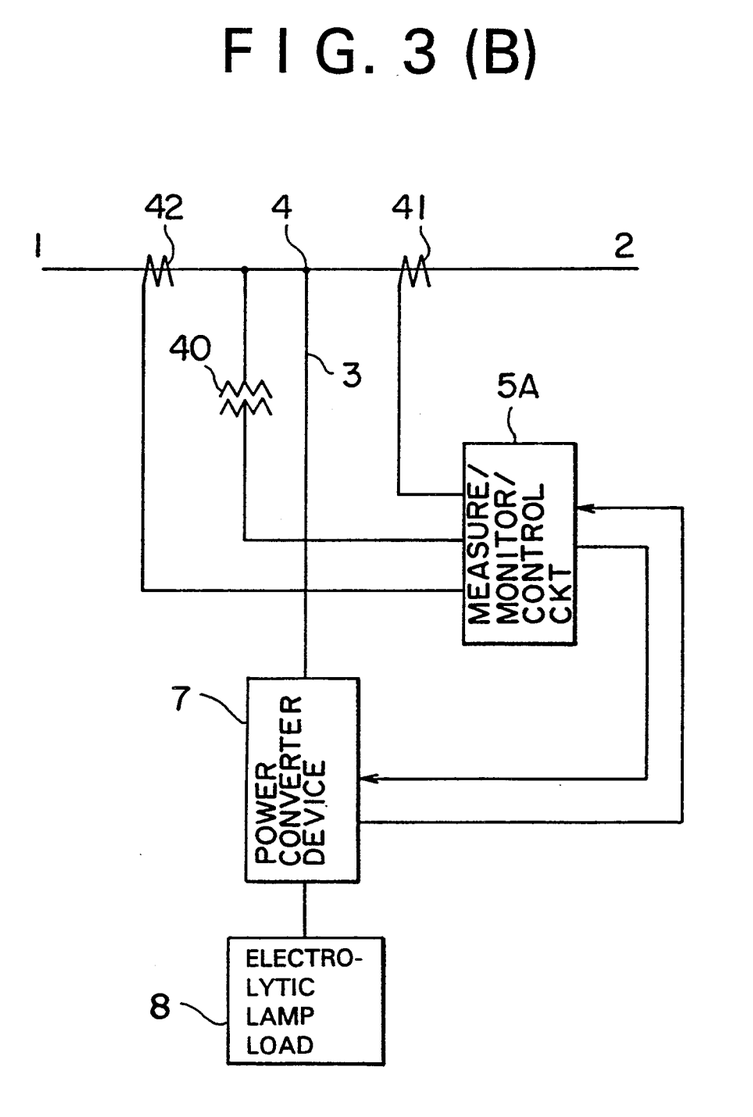
FIG. 3 is a block diagram of a thyrister converter circuit with higher harmonics suppression according to this invention.
Figure 3A:
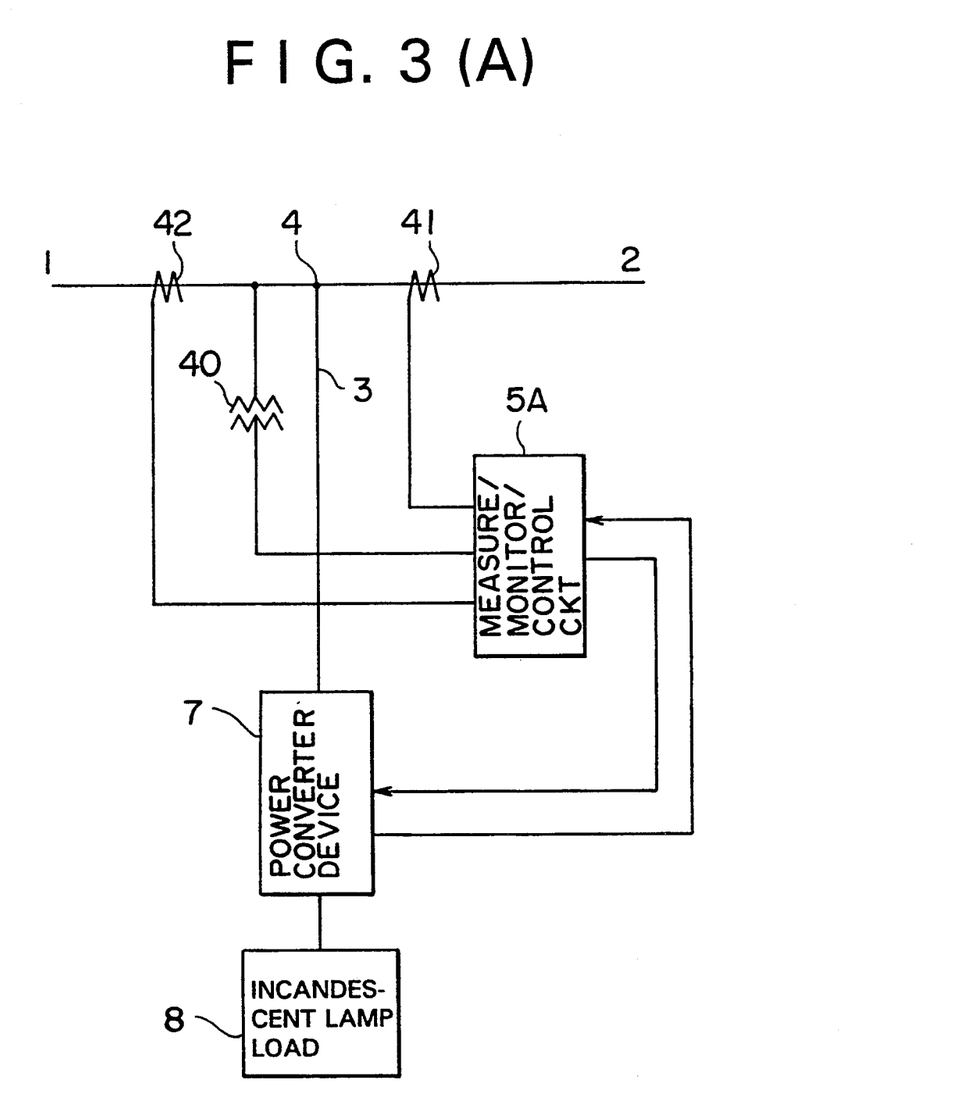
FIG. 3A is a block diagram of a thyristor converter circuit like that of FIG. 3 with an incandescent lamp load.

FIG. 3 shows a thyrister converter system with a means for suppressing higher harmonics according to this invention. As in the case of the system of FIG. 1, a branch 3 is connected to an intermediate point 4 between the feeder supply side 1 and a load side 2. The outputs of the instrument transformers 40, 41, and 42, which detect the voltage at the node point 4, the load current at the side of the user, and the current at the power system side, respectively, are introduced to the measurement/monitor/control circuit 5A, which measures and monitors the higher harmonics as described hereinbelow. A semiconductor power converter device 7, e.g., a thyrister bridge type converter circuit, is connected to the node 4 to supply power to the branch load 8 in response to the output of the control circuit 5A.

The measurement/monitor/control circuit 5A determines, on the basis of the outputs of the potential transformer 40 and the current transformers 41 and 42, etc., the voltage and the currents containing higher harmonics which are present in the power system. On the basis of these determinations, the control circuit 5A controls the thyrister converter circuit 7 when necessary. As a result of this, the electrical input applied to the branch load 8 becomes somewhat different from that which would have been introduced thereto under no control. It is particularly noteworthy that when the measurement/monitor/control circuit 5A has a precise control performance comparable to that of the active filter which has hitherto been used for higher harmonic suppression, the higher harmonic contents of current fed can be reduced sufficiently to magnitudes substantially equal to the nominal low levels.

Figure 4:
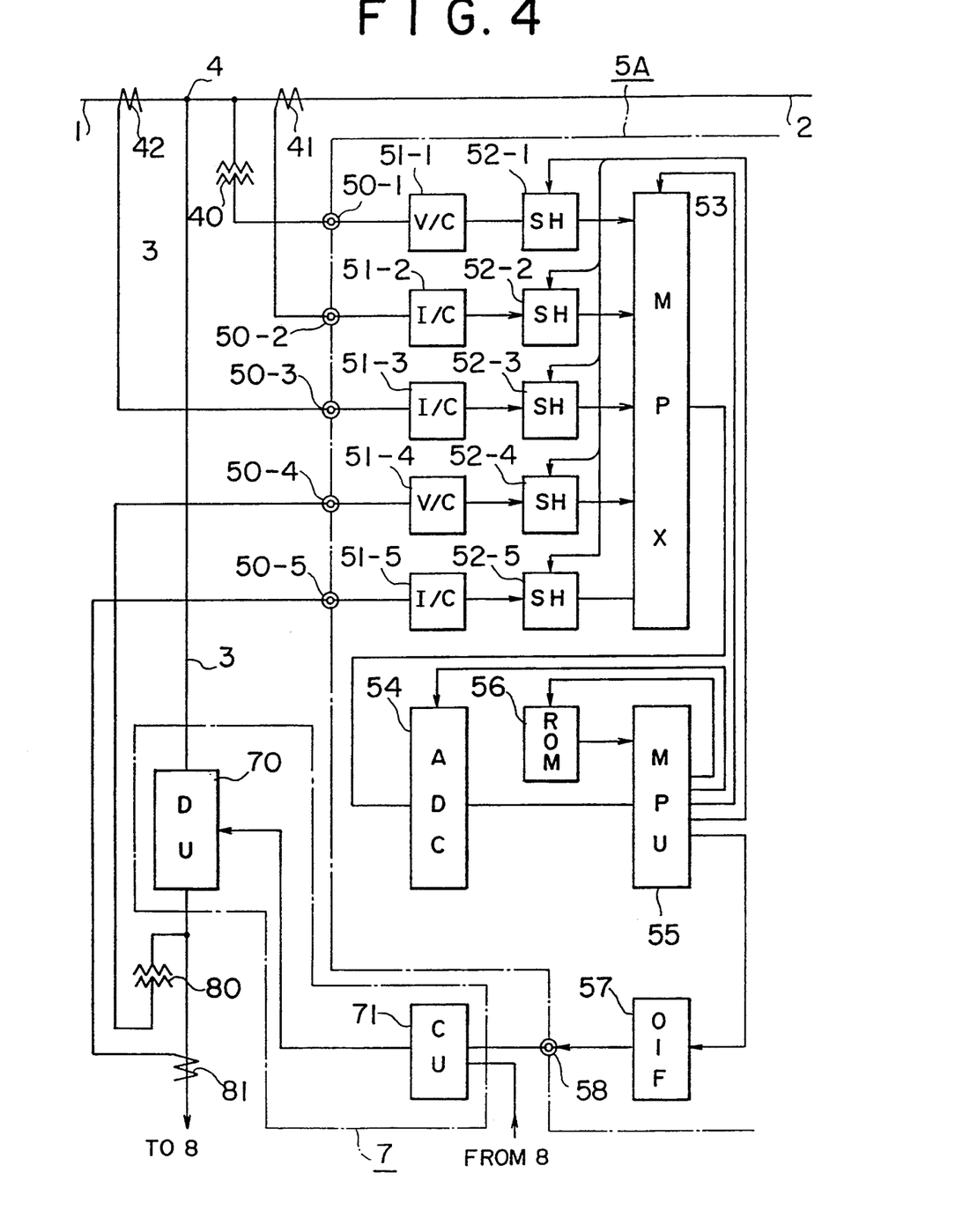
FIG. 4 is a block diagram showing an implementation of the thyrister converter circuit of FIG. 3.

FIG. 4 shows an example of the instrumentation of the control circuit 5A, together with details of other circuit elements. As shown in FIG. 4, the control circuit 5A comprises input terminals 50-1 through 50-5. The outputs of the transformers 40 through 42 are connected to the input terminals 50-1 through 50-3, respectively. The input terminals 50-4 and 50-5 are connected to the outputs of a potential transformer 80 and a current transformer 81 respectively, as described hereinbelow. Converters 51-1 through 51-5, coupled to the input terminals 50-1 through 50-5, respectively, convert the voltages and the currents input to the respective input terminals to corresponding voltages of appropriate magnitudes. The sample hold amplifiers 52-1 through 52-5, connected to the converters 51-1 through 51-5, respectively, hold and store therein at the proper instance the respective outputs of the converters connected thereto. A multiplexer 53 connected to the sample hold amplifiers 52-1 through 52-5 switches over (i.e., successively changes over) the analog outputs of the sample and hold amplifiers, so as to supply the multiplexed analog outputs of the sample hold amplifiers to the A/D converter 54. The A/D converter 54 converts into a corresponding digital output the multiplexed analog sample voltages received from the multiplexer 53. A microprocessor 55 receives this digital output from the A/D converter 54 and performs predetermined logical and arithmetic operations thereon. The ROM 56 stores, for example, the trigonometric functions table in a tabular data form, so as to offer an auxiliary memory means for the numerical operations of the microprocessor 55. An output interface 57, consisting of a level-converter is provided for yielding, via the output terminal 58, the results of the judgements of the microprocessor 55 obtained from the operations thereof. The above component parts 50 through 58 comprise the measurement/monitor/control circuit 5A.

Also as shown in FIG. 4, the thyrister bridge type converter circuit 7 comprises a power converter circuit unit 70 and a control circuit unit 71. The control unit 71 has an input connected to the output terminal 58 of the control circuit 5A. In response to the result of the judgement of the microprocessor 55 received via the interface 57 and output terminal 58 of the control circuit 5A, the control unit 71 generates a wave-shaped pulse signal to control the power converter circuit unit 70. Further, the control circuit unit 71 comprises another input coupled to a feedback from the load 8, etc. The potential transformer 80 and the current transformer 81 measure the voltage and the current supplied to the branch load 8, respectively. The outputs of these transformers 80 and 81 are transmitted to the control circuit 5A via the input terminals 50-4 and 50-5, respectively.

Figure 4A:
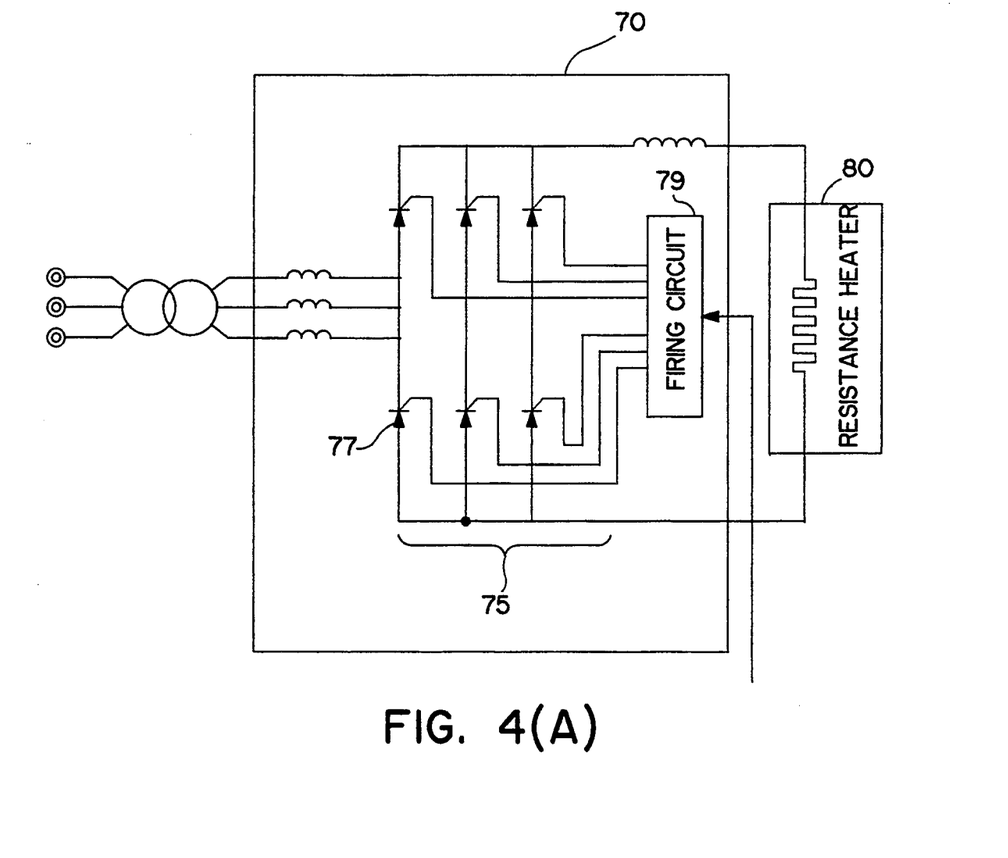
FIG. 4A is a schematic diagram of the thyrister converter circuit according to the present invention.

In accordance with the invention, a more detailed representation of the power converter device 70 is illustrated in FIG. 4A. The power converter circuit 70 includes a three-phase thyrister bridge circuit 75 connected to a firing circuit 79. The thyrister bridge circuit is composed of a number of switching elements in the form of thyristors 77. The branch load 8 connected to power converter device 70 is a resistance heater 8.

Figure 5A:
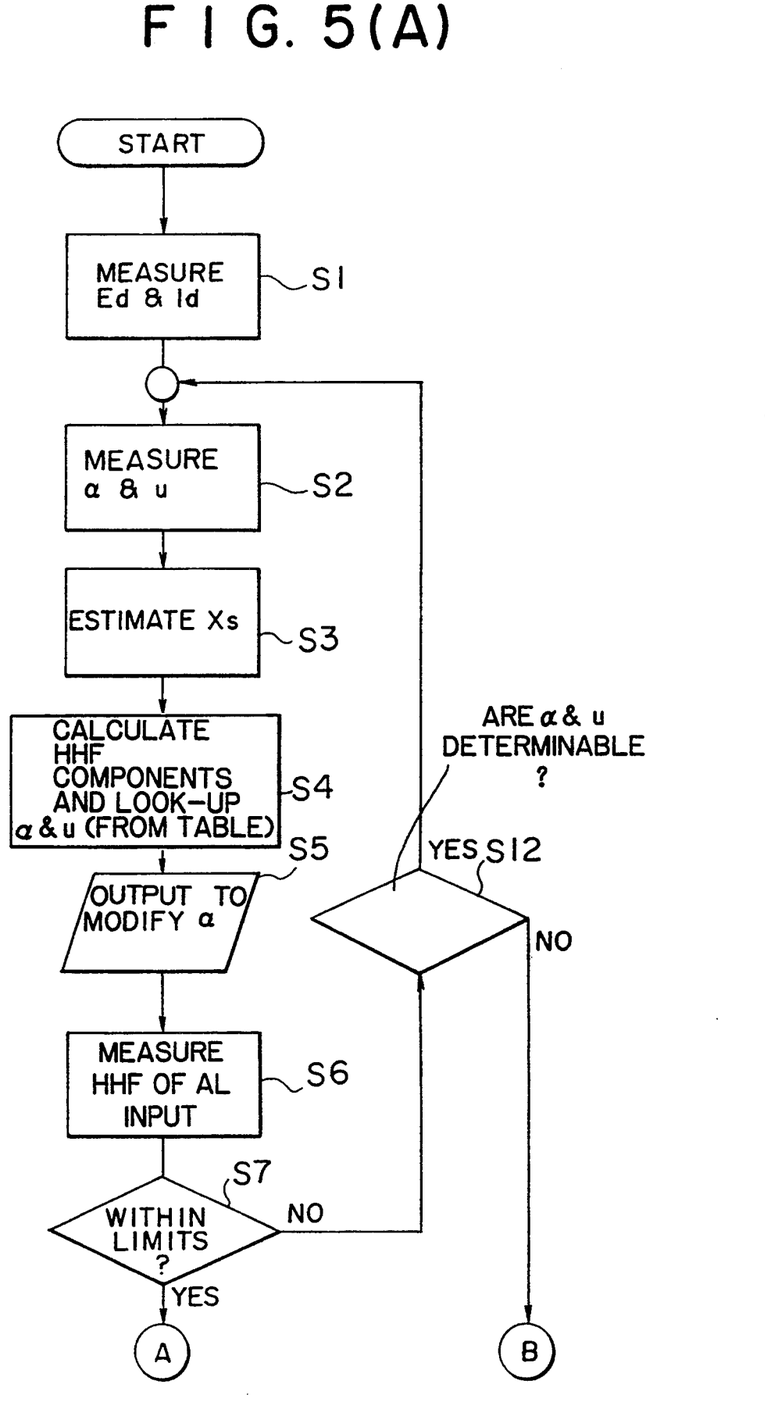
Figure 5B:
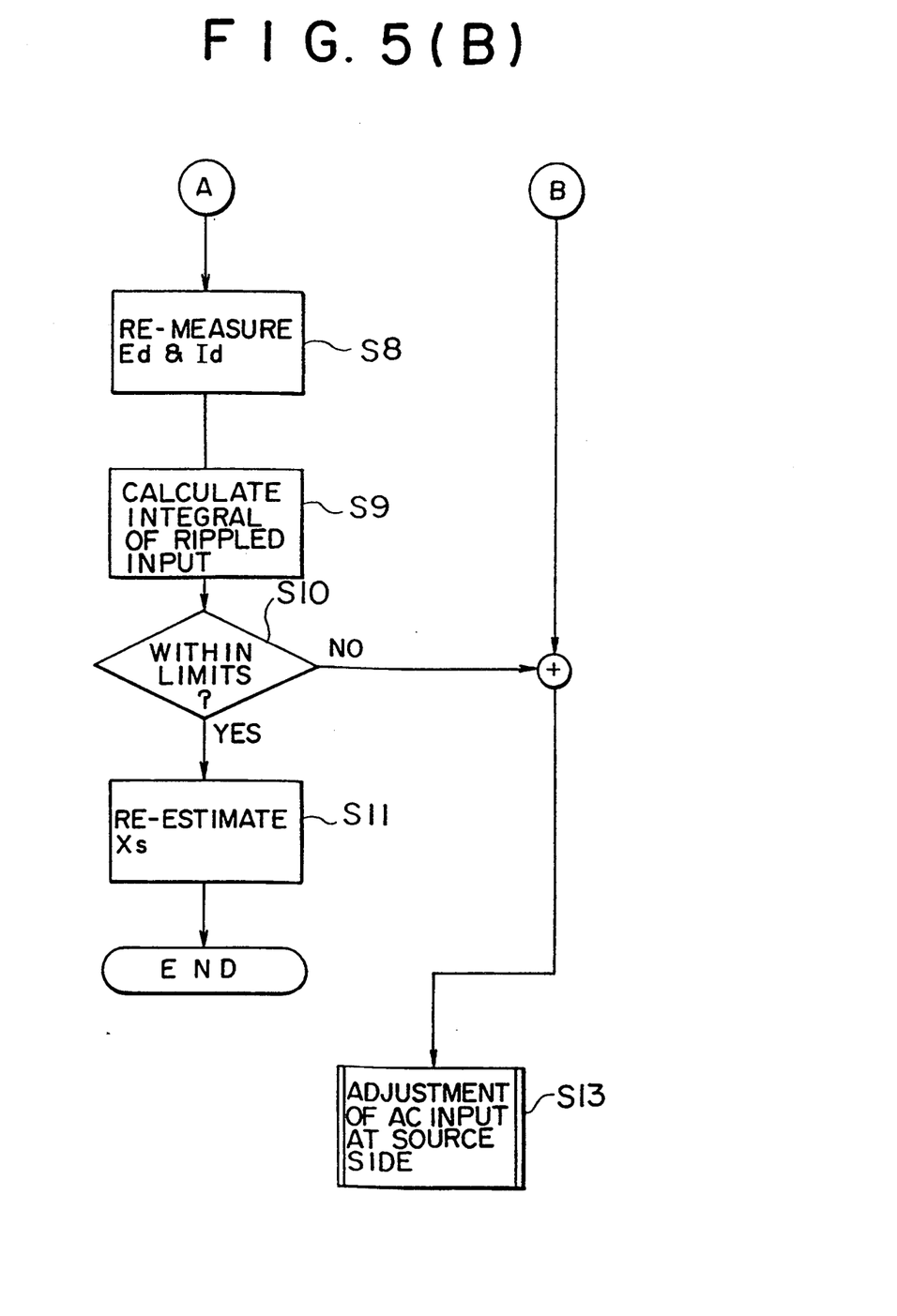

FIG. 5 is the flow chart showing the operations of the embodiment according to this invention as shown in FIGS. 3 and 4, wherein FIG. 5(A) and FIG. 5(B) show the first and the second half, respectively.

Thus, at step S1, the voltage Ed and the current Id at the output side of the thyrister converter circuit 7 are measured.

Next, at step S2, from the instantaneous values of the voltages and currents which are taken into the microprocessor 55 of the control circuit 5A, the voltage and current values of the power supply side 1, the load side 2, and the branch load side 8 are measured, and the control delay angle $\alpha$ and the overlap angle u are determined.

Further, at step S3, utilizing the voltage Ed and current Id as determined at step S1, and the delay angle $\alpha$ and the overlap angle u as determined at step S2, the reactance Xs of the power supply side 1 is estimated by means of the equation (2).

At the next step S4, utilizing the waveform data obtained as described above, HHF (higher harmonic frequency components), especially the 5th and 7th harmonic components which are predominant, contained in the voltage and the current at power supply side 1 are calculated. In addition, necessary correcting action to modify $\alpha$ and u is determined.

When the higher harmonics components determined at step S4 are larger than predetermined target values, appropriate set values of the delay angle α and the overlap angle u are selected from a numerical table of α, u and the harmonic components which is pre-calculated and stored in a read-only-memory such as the ROM 56. It is noted in this connection that the relationship between the higher harmonics components, the control delay angle α and the overlap angle u can be determined, as described above, in a graphical form when the value of the reactance Xs is set. When it is judged that reduction of the higher harmonic components to appropriate levels can be efficient, the delay angle α of the power converter unit 70 is modified accordingly at step S5 in response to the output from the control circuit unit 71 in the thyrister converter circuit 7.

Next, at step S6, the HHF or higher harmonic components are discriminated as in the first half of step S4.

At step S7, it is determined whether the higher harmonics components as discriminated above are within a predetermined allowable range.

When the judgement at step S7 is acceptable, as shown in FIG. 5B, the voltage Ed and the current Id at the side of the branch load 8 are measured again at step S8. Further, at the subsequent step S9, the time integral of the input variation to the branch load 8 is calculated. At step S10, it is determined whether or not the integral of the input variation to the load side as determined above is within predetermined allowable limits. When the discrimination at step S10 is of no problem, the reactance Xs of the power source 1 is estimated again, thereby ending the series of operations.

Alternatively, when the adjustment of the value of the delay angle α at step S5 is not appropriate, and the reductions of the higher harmonic contents to predetermined small levels cannot be effected, the delay angle α should be readjusted. Thus, when it is determined at step S7 that the higher harmonic components as measured are not within the predetermined allowable range, the control proceeds to step S12 where it is judged whether the values of the delay angle α and the overlap angle u satisfying the above equation (3) which reduce the higher harmonic components below the predetermined levels can be found or not. If the condition at step S12 is met, the sequence goes back to the step S2 as described above.

When the condition at step S12 is not met, the procedure goes over to step S13 where an adjustment at the power supply side 1 is effected. Similarly, when the condition at step S10 and S12 are not met (i.e., when it is judged that the harmonic contents as determined are not within the allowable limits and the solution of delay angle α and overlap angle u satisfying equation (3) can not be found), the procedure goes over to step S13 where the input adjustment at the power supply side 1 is effected.

Generally, when there are no great variations at the power and load sides, the values of the delay angle α and the overlap angle u satisfying the above equation (3) can be determined such that higher harmonic contents are kept under predetermined levels and such that the integral of the input variation to the branch load 8 is maintained within allowable limits. When, however, there are great variations at the power source or the load side, the input adjustments by means of external source adjustment device are effected at step S13.

In addition, when there is some wave shape distortion in the supply voltage and current of the power system, a more elaborate wave shape adjustment fitted to the distorted supply should be employed in place of the above procedures. The technique for such an adjustment is already used as a control procedure for active filters. Even in this case, the specific load is not affected by the output from the converter device, thus assuring the wave shape compensation of the input current and voltage fed to the converter system.

The philosophy of this invention is applicable with the modification of the control means when the above distortion can not be ignored.

While description has been made of the particular embodiments of this invention, it will be understood that many modifications may be made without departing from the spirit thereof. The appended claims are contemplated to cover any such modifications as fall within the true spirit and scope of this invention.

What is claimed is:

1. A converter system for higher harmonic suppression, adapted to be coupled to an AC power source, said system comprising:
   a first input portion adaptable to be connected to an AC power source defining a power source side;
   a second input portion interconnected with said first input portion adaptable to be connected to a system load defining an AC load side;
   semiconductor converter circuit having a predetermined rise and fall time, said semiconductor converter circuit including semiconductor switching elements coupled across the AC power source for converting AC power supplied from the AC power source into DC power having an input connected to said first and second input portions and an output connectable to a branch load having a large time constant;
   measurement means for measuring electrical parameters at said first input portion, said second input portion and a connection point of said first and second input portions and the converter circuit input;
   means for determining control delay angels and overlap angles of voltage and current supplied from the AC power source; and
   a control circuit, having inputs coupled to outputs of the measurement means, for controlling the switching operations of the semiconductor switching elements of the semiconductor converter circuit, wherein the control circuit means controls the delay angle of the semiconductor switching elements such that the higher harmonics contents of a current flowing into the power source side are minimized.

2. A converter system as claim din claim 1, where the measurement means comprises instrument transformers for measuring voltages and currents at the power source side and the load side.

3. A converter system as claimed in claim 1, wherein the semiconductor switching elements comprise thyristers.

4. A converter system as claimed in claim 1, wherein the semiconductor switching elements comprise thyristers.

5. A converter system as claimed in claim 1, wherein the control circuit means comprises:
   sample and hold circuit means for holding sample values of the electrical parameters measured at predetermined time points by the measurement means;

multiplexer means coupled to the hold circuit means; and a microprocessor, coupled to the multiplexer means, for calculating harmonic components of converter input and determining the control delay angle in response to an output of the multiplexer means.

6. A converter system as claimed in claim 1 further comprising a system load connected to said second input portion.

7. A converter system as claimed in claim 6, wherein the system load includes a resistance heater.

8. A converter system as claimed in claim 6 wherein the system load comprises an incandescent lamp.

9. A converter system as claimed in claim 6, wherein the system load includes an electrolytic cell.

10. A converter system as claimed in claim 1, wherein the branch load has a time constant which is greater than the rise time of the semiconductor converter circuit.

11. A system for suppressing higher harmonics in an AC line extending between a supply and a load, the system comprising:

a power supply input line;

a system load input line;

a converter circuit including semiconductor switching elements and an output line, said power supply input line, said system load input line and said semiconductor converter circuit being connected at a node;

measurement means for measuring electrical parameters of said system load input line and said power supply input line;

means for determining control delay angles and overlap angles according to the electrical parameters of said system load input line and said power supply input line; and means for adjusting the overlap angles to control harmonic contents of system current.

12. A system for suppressing higher harmonics according to claim 11 further comprising a branch load connected to the output line of the converter circuit.

13. A system for suppressing higher harmonics according to claim 12 wherein the converter circuit has a rise and fall time which is shorter than the time constant of the branch load.

14. A converter system as claimed in claim 12, wherein the branch load is an electrolytic cell.

15. A converter system as claimed in claim 12, wherein the branch load is a resistance heater.

16. A system for suppressing higher harmonics according to claim 12 wherein the branch load has a time constant and an angular frequency component, wherein a product of the time constant and the angular frequency component is much greater than unity.

17. A method of reducing high harmonic frequency components in a current and voltage signals comprising the steps of:

determining control delay angles and overlap angles of voltage and current signals;

measuring harmonic contents of the voltage and current signals;

comparing the measured harmonic contents with predetermined values;

adjusting the control delay angle and overlap angle until the harmonic contents of the voltage and current signals are lower than a predetermined value.

18. A method of reducing high harmonic frequency components in a converter system adapted to be coupled to an AC power source, a system load and a branch load comprising the steps of:

determining overlap angles and control delay angles based on voltage and current measurements at a power source side and a system load side;

calculating harmonic contents of the voltage and current signals measured at the power source side;

setting a control delay angle and an overlap angle to a predetermined value when the harmonic contents of a signal are higher than a predetermined value, thus eliminating the high harmonics contents from the signal.

* * * * *

UNITED STATES PATENT AND TRADEMARK OFFICE
CERTIFICATE OF CORRECTION

PATENT NO. : 5,347,441
DATED : September 13, 1994
INVENTOR(S) : TERADA et al.

It is certified that error appears in the above-indentified patent and that said Letters Patent is hereby corrected as shown below:

Column 12, line 53, change "claim din" to --claimed in--;

Column 12, line 60, change "1" to --2--.

Signed and Sealed this

Thirty-first Day of January, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,347,441
DATED : September 13, 1994
INVENTOR(S) : Terada et al.

It is certified that error appears in the above-indentified patent and that said Letters Patent is hereby corrected as shown below:

Column 12, line 41, change "angels" to --angles--.

Signed and Sealed this

Twenty-eight Day of March, 1995

Attest:

BRUCE LEHMAN

*Attesting Officer*  *Commissioner of Patents and Trademarks*